(12) United States Patent
Wesemann et al.

(10) Patent No.: US 12,021,667 B2
(45) Date of Patent: Jun. 25, 2024

(54) TRANSMISSION SYSTEM WITH CHANNEL ESTIMATION BASED ON A NEURAL NETWORK

(71) Applicant: Nokia Technologies Oy, Espoo (FI)

(72) Inventors: Stefan Wesemann, Kornwestheim (DE); Yejian Chen, Stuttgart (DE); Thorsten Wild, Stuttgart (DE); Jafar Mohammadi, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/623,445

(22) PCT Filed: Jul. 3, 2019

(86) PCT No.: PCT/EP2019/067806

§ 371 (c)(1),
(2) Date: Dec. 28, 2021

(87) PCT Pub. No.: WO2021/001032

PCT Pub. Date: Jan. 7, 2021

(65) Prior Publication Data

US 2022/0376956 A1 Nov. 24, 2022

(51) Int. Cl.
*H04L 25/02* (2006.01)
*H04B 7/0413* (2017.01)

(52) U.S. Cl.
CPC ....... *H04L 25/0254* (2013.01); *H04B 7/0413* (2013.01); *H04L 25/0224* (2013.01)

(58) Field of Classification Search
CPC ........... H04B 7/08; H01Q 1/243; H01Q 1/245
See application file for complete search history.

(56) References Cited

U.S. PATENT DOCUMENTS

| 5,914,959 A | * | 6/1999 | Marchetto | H04L 1/1893 |
| | | | | 455/67.11 |
| 2004/0047435 A1 | * | 3/2004 | Su | H04L 25/025 |
| | | | | 375/316 |

(Continued)

FOREIGN PATENT DOCUMENTS

| EP | 2 757 750 A1 | 7/2014 |
| JP | H-0548391 A | 2/1993 |

(Continued)

OTHER PUBLICATIONS

George, Mathew et al., "Neural Network Estimation for MIMO-OFDM Receivers", 2014 International Conference on Circuits, Power and Computing Technologies, Mar. 20, 2014, pp. 1329-1333, abstract only.

(Continued)

*Primary Examiner* — David B Lugo
(74) *Attorney, Agent, or Firm* — Joseph C. Drish; Harrington & Smith

(57) ABSTRACT

An apparatus, method and computing program is described including: receiving one or more received symbols and one or more received bits, wherein the received symbols are received at a receiver of a transmission system including a transmitter, a channel, and the receiver; converting one or more of the received bits that are deemed to be correct into one or more estimated transmission symbols; generating an estimated channel transfer function based on one or more of the estimated transmission symbols and corresponding received symbols; and providing training data pairs, each training data pair including a first element based on the estimated channel transfer function and a second element based on the corresponding received symbols.

16 Claims, 12 Drawing Sheets

(56) References Cited

U.S. PATENT DOCUMENTS

| | | | |
|---|---|---|---|
| 2006/0068714 A1 | 3/2006 | Sharma et al. | |
| 2011/0044382 A1* | 2/2011 | Nakamura | H04L 25/067 |
| | | | 375/229 |
| 2013/0163704 A1* | 6/2013 | Liu | H04L 1/0061 |
| | | | 375/346 |
| 2017/0012670 A1* | 1/2017 | Demaj | H04L 27/2647 |
| 2018/0083803 A1* | 3/2018 | Lee | H04L 25/0224 |
| 2022/0014398 A1* | 1/2022 | Andrews | H04B 1/40 |
| 2022/0060264 A1* | 2/2022 | Zhang | H04B 17/12 |

FOREIGN PATENT DOCUMENTS

| | | |
|---|---|---|
| JP | 2006101508 A | 4/2006 |
| JP | 2014187418 A | 10/2014 |

OTHER PUBLICATIONS

Aboutaleb, Ahmed et al., "Symbol Detection and Channel Estimation using Neural Networks in Optical Communication Systems", 2019 IEEE International Conference on Communications, May 20, 2019, pp. 1-6, abstract only.

George, Mathew, et al., "Neural Network Estimation for MIMO-OFDM Receivers", 2014 International Conference on Circuit, Power and Computing Technologies [ICCPCT], IEEE, Dec. 31, 2014, pp. 1329-1333.

\* cited by examiner

TRANSMISSION SYSTEM WITH CHANNEL ESTIMATION BASED ON A NEURAL NETWORK

CROSS REFERENCE TO RELATED APPLICATION

This patent application is a U.S. National Stage application of International Patent Application Number PCT/EP2019/067806 filed Jul. 3, 2019, which is hereby incorporated by reference in its entirety.

FIELD

The present specification relates to transmission systems, such as the training and use of transmission systems.

BACKGROUND

A simple transmission system includes a transmitter, a transmission channel (e.g. a propagation channel), and a receiver. One of more of the elements of such a transmission system may be trained, for example on the basis of generated training data. Although developments have been made, there remains scope for further developments in this area.

SUMMARY

In a first aspect, this specification provides an apparatus comprising: means for receiving (e.g. at an input of a training data generator) one or more received symbols and one or more received bits, wherein the received symbols are received at a receiver of a transmission system (e.g. at a base station of a receiver terminal of the transmission system, at a user device, at a control node etc.), the transmission system comprising a transmitter, a channel (e.g. one or more channels), and the receiver, wherein the transmitter includes a transmitter algorithm for converting one or more transmission bits into one or more transmission symbols and the receiver includes a receiver algorithm for converting the one or more received symbols into one or more received bits; means for converting one or more of the received bits that are deemed to be correct into one or more estimated transmission symbols; means for generating an estimated channel transfer function based (at least in part) on one or more of the estimated transmission symbols and corresponding received symbols; and means for providing training data pairs, each training data pair comprising a first element based on the estimated channel transfer function and a second element based on the corresponding received symbols (e.g. decorrelated received data, such as decorrelated and averaged received symbols, which data may be related to the received symbols and the estimated transmitted symbols). The transmission system may be multiple input multiple output (MIMO) transmission system.

The channel of the transmission system may be described by an array of arbitrary dimension (e.g., the propagation for the case of multiple transmit antennas, multiple receive antennas and multiple subcarriers can be described by 3-dimensional complex array). However, if the channel estimator does not exploit any relationship (such as covariance) between multiple channels, then the channels may be treated separately; that is, not as a multi-dimensional array.

The means for converting said one or more of the received bits that are deemed to be correct into one or more estimated transmission symbols may comprise a modulation module, such as a modulation module for converting bits (such as encoded bits, e.g. LEDP coded bits) into modulated symbols (e.g. QAM symbols, or some other symbols). Alternatively, or in addition, the means for converting said one or more of the received bits that are deemed to be correct into one or more estimated transmission symbols may comprise a multiplexer for combining modulated bit symbols with pilot symbols.

The multiplexing may be carried out on the modulated symbols.

Some embodiments further comprise means for determining whether the received transmission bits are deemed to be correct. The said means may be a parity checking module.

The means for generating the estimated channel transfer function may comprise a channel estimator.

Some embodiments further comprise a database for storing said training data pairs.

In a second aspect, this specification provides an apparatus comprising: means for initialising trainable parameters of a channel estimator module (e.g. a neural-network based channel estimator module) of a receiver of a transmission system (e.g. a multiple input multiple output (MIMO) transmission system), wherein the transmission system comprises a transmitter, one or more channels, and the receiver, wherein the transmitter includes a transmitter algorithm for converting one or more transmission bits into one or more transmission symbols and the receiver includes a receiver algorithm for converting the one or more received symbols into one or more received bits and wherein the channel estimator module of the receiver generates an estimate of a transfer function of said channel; means for generating updated parameters for the channel estimator module of the receiver based on stored training data pairs, wherein each training data pair comprises a first element based on an estimated channel transfer function and a second element based on a corresponding received symbols (e.g. decorrelated received data, such as decorrelated and averaged received symbols, which data may be related to the received symbols and the estimated transmission symbols), wherein the means for generating the updated parameters comprises means for minimising a loss function (e.g. using stochastic gradient descent, or some similar algorithm); and means for updating the trainable parameters of the channel estimator module of the receiver on the basis of said generated updated parameters. The training data pairs of the second aspect may be provided using the apparatus as described above with reference to the first aspect.

Some embodiments further comprise a means for controlling repeated generation of updated parameters using the means for generating updated parameters and repeated updating of said trainable parameters using the means for updating trainable parameters. The generation of updated parameters may be repeated until a first condition is reached. Examples of such a first condition include a defined number of iteration or a defined performance level. Alternatively, or in addition, the algorithm may be repeated as new training data is received. The means for controlling repeated generation of updated parameters and repeated updating of said trainable parameters operates in response to updated training data (such as a given number of additional training data points).

In the first or the second aspect, the second element of said training data pairs may comprise decorrelated received data. Said decorrelated received data may comprise decorrelated and averaged received symbols.

Some embodiments further comprise a database for storing said training data pairs.

In a third aspect, this specification provides an apparatus comprising: means for receiving one or more symbols at a receiver of a transmission system (e.g. a multiple input multiple output (MIMO) transmission system) comprising a transmitter, a channel (e.g. one or more channels), and the receiver, wherein the transmitter includes a transmitter algorithm (which transmitted algorithm may include one or more of pilot symbol insertion, encoding or modulation) for converting one or more transmission bits into one or more transmission symbols and the receiver includes a receiver algorithm (e.g. including one or more of pilot symbol extraction, demodulation or decoding) for converting the one or more received symbols into one or more received bits; means for separating (e.g. using a demultiplexer) the received symbols into received data symbols and received pilot symbols; means for processing the received pilot signals using a channel estimator module (e.g. a neural-network based channel estimator) of the receiver of the transmission system, wherein said channel estimator module comprises a trainable algorithm configured to generate an estimate of a transfer function of said channel; means for processing the received data symbols depending on the output of said channel estimator module; and means for converting the processed received data symbols into received data bits.

The channel of the transmission system may be described by an array of arbitrary dimension (e.g., the propagation for the case of multiple transmit antennas, multiple receive antennas and multiple subcarriers can be described by 3-dimensional complex array). However, if the channel estimator does not exploit any relationship (such as covariance) between multiple channels, then the channels may be treated separately; that is, not as a multi-dimensional array.

The means for converting the processed received data symbols may comprise a demodulation module and/or a decoder module.

The receiver of the transmission system may receive inputs comprising a plurality of layers.

The receiver of the transmission system may form part of a mobile communication base station. Alternatively, or in addition, the receiver of the transmission system may form part of a user device.

In the first to third aspects, the channel estimator may be implemented using a neural network, such as a convolutional network. The convolution neural network may comprise multiple later (e.g. two layers) and may comprise an activation layer (e.g. softmax or ReLu activation).

In the first to third aspects, the one or more received symbols may be comprised in a plurality of data layers. The means for processing the received data symbols may comprise an interference cancellation module. The interference cancellation module may be configured to cancel received signal contributions of symbols corresponding to one or more unwanted data layers of the plurality of data layers to allow processing of received symbols from a respective wanted data layer.

In a fourth aspect, this specification provides a method comprising: receiving one or more received symbols and one or more received bits, wherein the received symbols are received at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; converting one or more of the received bits that are deemed to be correct into one or more estimated transmission symbols; generating an estimated channel transfer function based on one or more of the estimated transmission symbols and corresponding received symbols; and providing training data pairs, each training data pair comprising a first element based on the estimated channel transfer function and a second element based on the corresponding received symbols.

Converting said one or more of the received bits that are deemed to be correct into one or more estimated transmission symbols may comprise converting bits (such as encoded bits, e.g. LEDP coded bits) into modulated symbols (e.g. QAM symbols, or some other symbols). Alternatively, converting said one or more of the received bits that are deemed to be correct into one or more estimated transmission symbols may comprise combining modulated bit symbols with pilot symbols.

The method may comprise determining whether the received transmission bits are deemed to be correct. The said means may be a parity checking module.

A database may be provided for storing said training data pairs.

In a fifth aspect, this specification describes a method comprising: initialising trainable parameters of a channel estimator module of a receiver of a transmission system, wherein the transmission system comprises a transmitter, one or more channels, and the receiver, wherein the transmitter includes a transmitter algorithm for converting one or more transmission bits into one or more transmission symbols and the receiver includes a receiver algorithm for converting the one or more received symbols into one or more received bits and wherein the channel estimator module of the receiver generates an estimate of a transfer function of said channel; generating updated parameters for the channel estimator module of the receiver based on stored training data pairs, wherein each training data pair comprises a first element based on an estimated channel transfer function and a second element based on a corresponding received symbols, wherein the means for generating the updated parameters comprises means for minimising a loss function (e.g. using stochastic gradient descent, or some similar algorithm); and updating the trainable parameters of the channel estimator module of the receiver on the basis of said generated updated parameters. In one example, the channel estimator module is implemented using a neural network, such as a convolutional network. The convolution neural network may comprise multiple later (e.g. two layers) and may comprise an activation layer (e.g. softmax or ReLu activation).

The training data pairs of the fifth aspect may be provided using the method described above with reference to the fourth aspect.

Some embodiments further comprise controlling repeated generation of updated parameters using the means for generating updated parameters and repeated updating of said trainable parameters using the means for updating trainable parameters. The generation of updated parameters may be repeated until a first condition is reached (such as a defined number of iteration or a defined performance level). Alternatively, or in addition, updating of said trainable parameters may be repeated in response to updated training data (such as a given number of additional training data points).

In a sixth aspect, this specification describes a method comprising: receiving one or more symbols at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; separating the received symbols into received data symbols and received pilot symbols; processing the received pilot signals using a channel estimator module of the receiver of the transmission system, wherein said channel estimator module comprises a trainable algorithm configured to generate an estimate of a transfer function of said channel; processing the received data symbols depending on the output of said channel estimator module; and converting the processed received data symbols into received data bits. The channel estimator module may be implemented as a neural network.

The received symbols may be comprised in one or a plurality of layers.

Processing the received data symbols may comprise an interference cancellation module, for example an interference cancellation module for cancelling received signal contributions of symbols corresponding to one or more unwanted data layers of the plurality of data layers to allow processing of received symbols from a respective wanted data layer.

The receiver of the transmission system may receive inputs comprising a plurality of layers.

The receiver of the transmission system may form part of a mobile communication base station. Alternatively, or in addition, the receiver of the transmission system may form part of a user device.

In a seventh aspect, this specification describes an apparatus configured to perform any method as described with reference to the fourth to sixth aspects.

In an eighth aspect, this specification describes computer-readable instructions which, when executed by computing apparatus, cause the computing apparatus to perform any method as described with reference to the fourth to sixth aspects.

In a ninth aspect, this specification describes a computer program comprising instructions for causing an apparatus to perform at least the following: receive one or more received symbols and one or more received bits, wherein the received symbols are received at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; convert one or more of the received bits that are deemed to be correct into one or more estimated transmission symbols; generate an estimated channel transfer function based on one or more of the estimated transmission symbols and corresponding received symbols; and provide training data pairs, each training data pair comprising a first element based on the estimated channel transfer function and a second element based on the corresponding received symbols.

In a tenth aspect, this specification provides a computer program comprising instructions for causing an apparatus to perform at least the following: initialise trainable parameters of a channel estimator module of a receiver of a transmission system, wherein the transmission system comprises a transmitter, one or more channels, and the receiver, wherein the transmitter includes a transmitter algorithm for converting one or more transmission bits into one or more transmission symbols and the receiver includes a receiver algorithm for converting the one or more received symbols into one or more received bits and wherein the channel estimator module of the receiver generates an estimate of a transfer function of said channel; generate updated parameters for the channel estimator module of the receiver based on stored training data pairs, wherein each training data pair comprises a first element based on an estimated channel transfer function and a second element based on a corresponding received symbols, wherein the means for generating the updated parameters comprises means for minimising a loss function (e.g. using stochastic gradient descent, or some similar algorithm); and update the trainable parameters of the channel estimator module of the receiver on the basis of said generated updated parameters. The channel estimator module may be implemented as a neural network.

In an eleventh aspect, this specification describes a computer program comprising instructions for causing an apparatus to perform at least the following: receive one or more symbols at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; separate the received symbols into received data symbols and received pilot symbols; process the received pilot signals using a channel estimator module of the receiver of the transmission system, wherein said channel estimator module comprises a trainable algorithm configured to generate an estimate of a transfer function of said channel; process the received data symbols depending on the output of said channel estimator module; and convert the processed received data symbols into received data bits. The channel estimator module may be implemented as a neural network.

In a twelfth aspect, this specification describes a computer readable medium comprising program instruction stored thereon for performing at least the following: receive one or more received symbols and one or more received bits, wherein the received symbols are received at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; convert one or more of the received bits that are deemed to be correct into one or more estimated transmission symbols; generate an estimated channel transfer function based on one or more of the estimated transmission symbols and corresponding received symbols; and provide training data pairs, each training data pair comprising a first element based on the estimated channel transfer function and a second element based on the corresponding received symbols.

In a thirteenth aspect, this specification describes a computer readable medium comprising program instruction stored thereon for performing at least the following: initialise trainable parameters of a channel estimator module of a receiver of a transmission system, wherein the transmission system comprises a transmitter, one or more channels, and the receiver, wherein the transmitter includes a transmitter algorithm for converting one or more transmission bits into one or more transmission symbols and the receiver includes a receiver algorithm for converting the one or more received symbols into one or more received bits and wherein the channel estimator module of the receiver generates an estimate of a transfer function of said channel; generate updated parameters for the channel estimator module of the receiver based on stored training data pairs, wherein each training data pair comprises a first element based on an estimated channel transfer function and a second element based on a corresponding received symbols, wherein the means for generating the updated parameters comprises means for minimising a loss function; and update the trainable parameters of the channel estimator module of the receiver on the basis of said generated updated parameters.

In an fourteenth aspect, this specification describes a computer readable medium comprising program instruction stored thereon for performing at least the following: receive one or more symbols at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; separate the received symbols into received data symbols and received pilot symbols; process the received pilot signals using a channel estimator module of the receiver of the transmission system, wherein said channel estimator module comprises a trainable algorithm configured to generate an estimate of a transfer function of said channel; process the received data symbols depending on the output of said channel estimator module; and convert the processed received data symbols into received data bits.

In a fifteenth aspect, this specification describes an apparatus comprising: at least one processor; and at least one memory including computer program code which, when executed by the at least one processor, causes the apparatus to: receive one or more received symbols and one or more received bits, wherein the received symbols are received at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; convert one or more of the received bits that are deemed to be correct into one or more estimated transmission symbols; generate an estimated channel transfer function based on one or more of the estimated transmission symbols and corresponding received symbols; and provide training data pairs, each training data pair comprising a first element based on the estimated channel transfer function and a second element based on the corresponding received symbols.

In a sixteenth aspect, this specification describes an apparatus comprising: at least one processor; and at least one memory including computer program code which, when executed by the at least one processor, causes the apparatus to: initialise trainable parameters of a channel estimator module of a receiver of a transmission system, wherein the transmission system comprises a transmitter, one or more channels, and the receiver, wherein the transmitter includes a transmitter algorithm for converting one or more transmission bits into one or more transmission symbols and the receiver includes a receiver algorithm for converting the one or more received symbols into one or more received bits and wherein the channel estimator module of the receiver generates an estimate of a transfer function of said channel; generate updated parameters for the channel estimator module of the receiver based on stored training data pairs, wherein each training data pair comprises a first element based on an estimated channel transfer function and a second element based on a corresponding received symbols, wherein the means for generating the updated parameters comprises means for minimising a loss function; and update the trainable parameters of the channel estimator module of the receiver on the basis of said generated updated parameters.

In an seventeenth aspect, this specification describes an apparatus comprising: at least one processor; and at least one memory including computer program code which, when executed by the at least one processor, causes the apparatus to: receive one or more symbols at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; separate the received symbols into received data symbols and received pilot symbols; process the received pilot signals using a channel estimator module of the receiver of the transmission system, wherein said channel estimator module comprises a trainable algorithm configured to generate an estimate of a transfer function of said channel; process the received data symbols depending on the output of said channel estimator module; and convert the processed received data symbols into received data bits.

In a eighteenth aspect, this specification describes an apparatus comprising: an input (e.g. a receiver memory) for receiving one or more received symbols and one or more received bits, wherein the received symbols are received at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; a converter module (such as an encoder and/or a modulator) for converting one or more of the received bits that are deemed to be correct into one or more estimated transmission symbols; a channel estimator for generating an estimated channel transfer function based on one or more of the estimated transmission symbols and corresponding received symbols; and an output for providing training data pairs, each training data pair comprising a first element based on the estimated channel transfer function and a second element based on the corresponding received symbols.

In a nineteenth aspect, this specification provides an apparatus comprising: an initialisation module for initialising trainable parameters of a channel estimator module (e.g. a neural-network based channel estimator module) of a receiver of a transmission system, wherein the transmission system comprises a transmitter, one or more channels, and the receiver, wherein the transmitter includes a transmitter algorithm for converting one or more transmission bits into one or more transmission symbols and the receiver includes a receiver algorithm for converting the one or more received symbols into one or more received bits and wherein the channel estimator module of the receiver generates an estimate of a transfer function of said channel; a parameter module for generating updated parameters for the channel estimator module of the receiver based on stored training data pairs, wherein each training data pair comprises a first element based on an estimated channel transfer function and a second element based on a corresponding received symbols, wherein the means for updating parameters module comprises means for minimising a loss function; and updating module for updating the trainable parameters of the channel estimator module of the receiver on the basis of said generated updated parameters.

In a twentieth aspect, this specification provides an apparatus comprising: an input for receiving one or more symbols at a receiver of a transmission system comprising a transmitter, a channel, and the receiver, wherein the transmitter includes a transmitter algorithm for converting one or more transmission bits into one or more transmission symbols and the receiver includes a receiver algorithm for converting the one or more received symbols into one or more received bits; a demultiplexer for separating the received symbols into received data symbols and received pilot symbols; a channel estimator module for processing the received pilot signals using a channel estimator module of the receiver of the transmission system, wherein said channel estimator module comprises a trainable algorithm configured to generate an estimate of a transfer function of said channel; a first processor (e.g. an interference rejection combiner) for processing the received data symbols depending on the output of said channel estimator module; and an output module for converting the processed received data symbols into received data bits.

BRIEF DESCRIPTION OF THE DRAWINGS

Example embodiments will now be described, by way of non-limiting examples, with reference to the following schematic drawings, in which.

DETAILED DESCRIPTION

Figure 1:
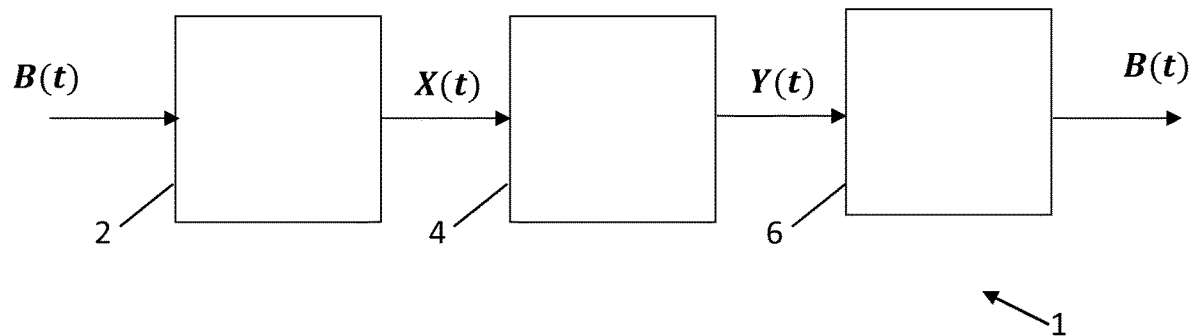
FIG. 1 is a block diagram of an example end-to-end communication system in accordance with an example embodiment.

The scope of protection sought for various embodiments is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example end-to-end communication system, indicated generally by the reference numeral 1, in accordance with an example embodiment. The system 1 includes a transmitter 2, a channel 4 and a receiver 6. Viewed at a system level, the system 1 converts an input bit stream B(t) received at the input to the transmitter 2 into an output bit stream B(t) at the output of the receiver 6. More specifically, the transmitter 2 converts the input bit stream B(t) into transmit symbols X(t) for transmission over the channel 4 and the receiver 6 generates the output bit stream B(t) from symbols Y(t) received from the channel 4.

Figure 2:
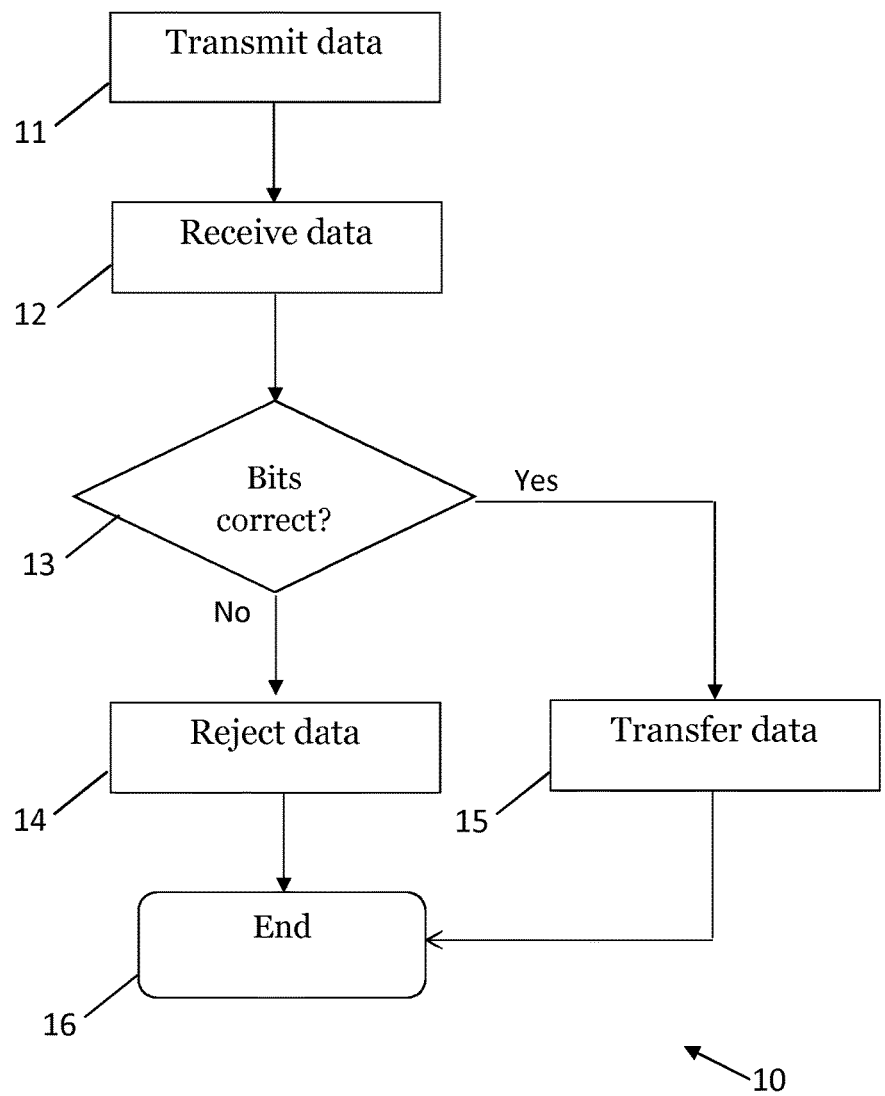
FIG. 2 is a flow chart showing an algorithm demonstrating an example use of the system of FIG. 1.

FIG. 2 is a flow chart showing an algorithm, indicated generally by the reference numeral 10, demonstrating an example use of the communication system 1.

The algorithm 10 starts at operation 11, where data is transmitter by the transmitter 2 to the receiver 6 using the channel 4. At operation 12, the transmitted data is received at the receiver 6. Thus, data symbols X(t) may be transmitted in the operation 1 and data symbols Y(t) received in the operation 12, from which an estimate of the original data stream B(t) can be derived.

At operation 13 of the algorithm 10, a determination is made of whether data received at the receiver 6 is correct (e.g. whether the estimated data bits at the receiver match the bits of the transmitted data stream). This may, for example, be implemented using a parity checking or similar algorithm. If the data is deemed to be incorrect, then the data is rejected at operation 14, before the algorithm 10 terminates at operation 16. If the data is deemed to be correct, then the data is transferred (e.g. for use elsewhere) at operation 15 and the algorithm 10 terminates at the operation 16.

In one example use of the algorithm 10, the rejection of received bits at the operation 14 trigger a re-transmission of the incorrectly received bits. In some example 4G and 5G transmission systems, a target block error rate for link adaptation (which determines modulation order and code rate) is 10%; that is, 9 out of 10 uplink transmissions should be correctly decoded.

Figure 3:
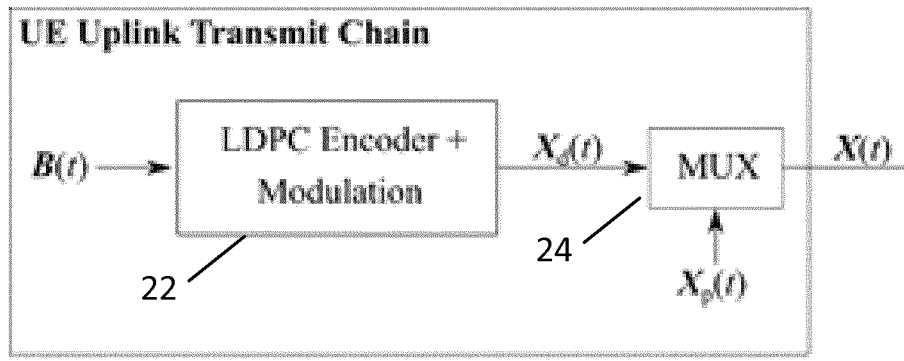
FIG. 3 is a block diagram of an example transmitter that may be used in the system of FIG. 1.

FIG. 3 is a block diagram of an example transmitter 2 that may be used in the communication system 1 described above. As shown in FIG. 3, the transmitter 2 includes an encoder and modulation module 22 and a multiplexer 24.

Figure 4:
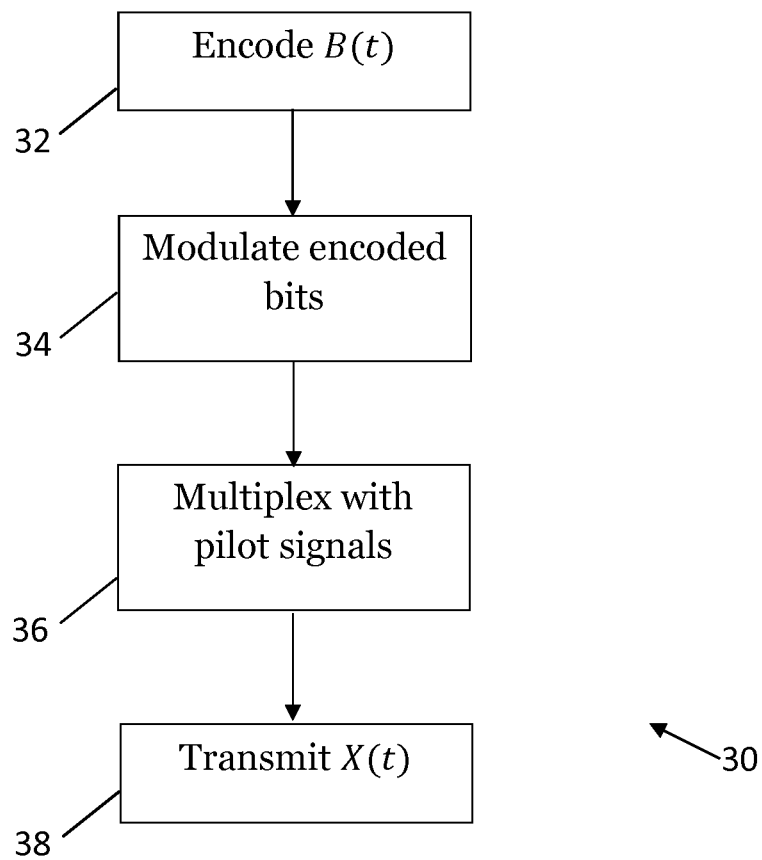
FIG. 4 is a flow chart showing an algorithm demonstrating an example use of the transmitter of FIG. 3.

FIG. 4 is a flow chart showing an algorithm, indicated generally by the reference numeral 30, demonstrating an example use of the transmitter 2 of FIG. 3.

The algorithm 30 starts at operation 32 where the encoder of the encoder and modulation module 22 encodes a sequence of information bits B(t) (for example, using LDPC channel encoding, although other channel coding schemes are possible). At operation 34, the encoded bits are mapped to transmission symbols by the modulator of the encoder and modulation module 22. For example, the encoded bits may be mapped to QAM symbols $X_d(t)$. Of course, alternative modulation schemes could be provided.

At operation 36, the modulated symbols $X_d(t)$ are multiplexed with pilot symbols $X_p(t)$ using the multiplexer 24. The resulting signal X(t) (the output of the transmitter 2) is transmitted through the channel 4 of the receiver 6 in operation 38.

Figure 5:
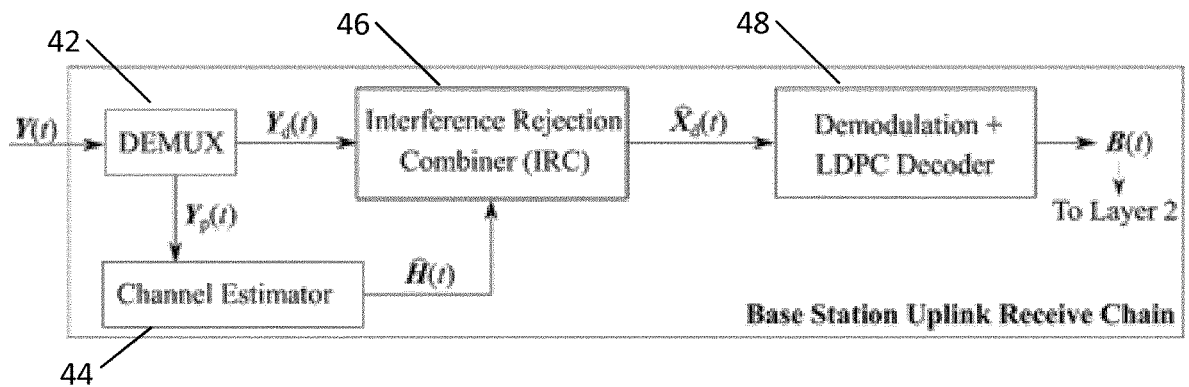
FIG. 5 is a block diagram of an example receiver that may be used in the system of FIG. 1 in accordance with an example embodiment.

FIG. 5 is a block diagram of an example receiver, indicated generally by the reference numeral 6, that may be used in the communication system 1 described above, in accordance with an example embodiment. As shown in FIG. 5, the receiver 6 comprises a demultiplexer 42, a channel estimator 44, an interference rejection combiner (IRC) 46 and a demodulator and decoder module 48.

Figure 6:
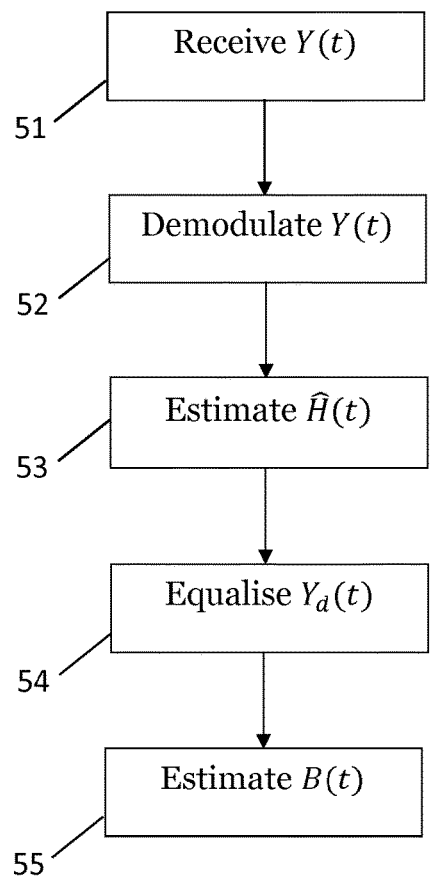
FIG. 6 is a flow chart showing an algorithm demonstrating an example use of the receiver of FIG. 5 in accordance with an example embodiment.

FIG. 6 is a flow chart showing an algorithm, indicated generally by the reference numeral 50, demonstrating an example use of the receiver 6 of FIG. 5 in accordance with an example embodiment.

At operation 51, the receiver 6 receives the signal Y(t) from the channel 4. The received signal Y(t) is demultiplexed into pilot symbols $Y_p(t)$ and data symbols $Y_d(t)$ at operation 52 using the demultiplexer 42.

At operation 53, the channel estimator 44 is used to generate an estimate FI(t) for channel transfer function. The channel transfer function estimate is derived from the received pilot symbols $Y_p(t)$ (provided by the demultiplexer 42 to the channel estimator 44).

The estimate of the channel transfer function H(t) is used to equalize the received data symbols $Y_d(t)$ at operation 54 (for example using the interference rejection combiner (IRC) 46, although alternative equalization arrangements could be used). In operation 55, the equalized data symbols $Y_d(t)$ are demodulated and decoded by the demodulator and decoder module 48 to generate estimates of the original information bits B(t).

If the decoding is successful (as determined, for example, by a successful CRC check), then the information bits B(t) are accepted (e.g. by handing over to Layer 2 (MAC) and having the base station acknowledge the proper reception of the data). As discussed above, if decoding is not successful, then the base station may trigger a re-transmission of the data.

The channel estimator 44 may take many forms. A possible approach to improve the quality of channel estimation is to incorporate assumptions about the channel model into the design of the estimator. For instance, we could assume a very large array and a single cluster of arriving signal power in a 3GPP channel model. Optimal estimation (in the sense of minimum mean squared error, MMSE) of a channel with unknown channel covariance matrix then becomes computationally tractable and can lead to better estimates than a simple least squares estimator.

Figure 7:
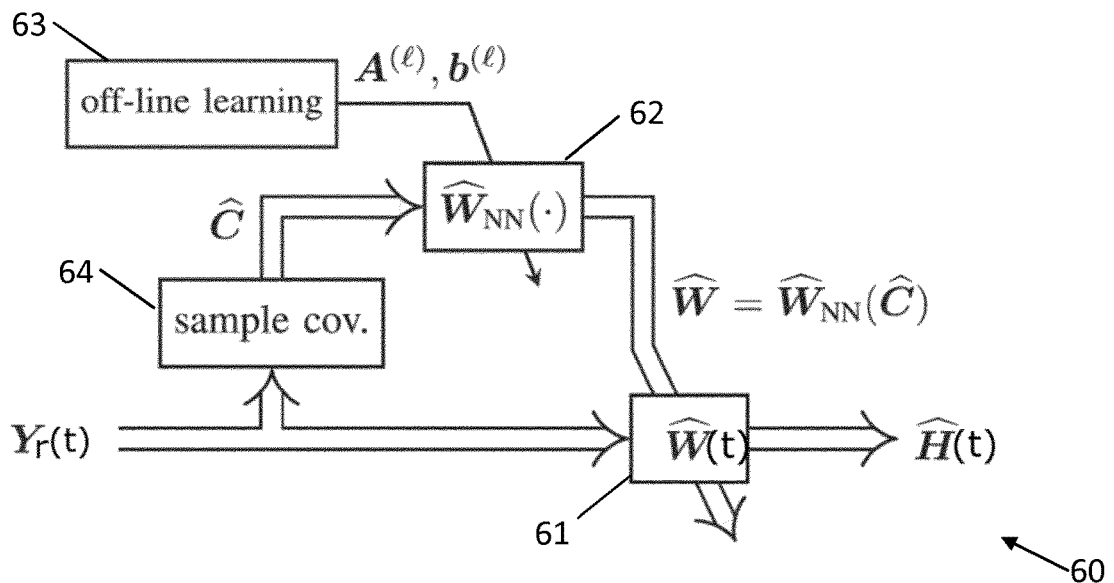
FIG. 7 is a block diagram of a system in accordance with an example embodiment.

FIG. 7 is a block diagram of a system, indicated generally by the reference numeral 60, showing an implementation of a channel estimator in accordance with an example embodiment. The system 60 comprises a channel estimator module 61, a neural network 62, an off-line learning module 63 and a sample covariance module 64.

The channel estimator module 61 can be used to compute a channel vector estimate Ĥ(t)= $\widehat{W(t)}$ $Y_r(t)$ at time t and can therefore be used to implement the channel estimator 44 of the receiver 6 described above.

The sample covariance module 64 generates (based on the received and decorrelated/averaged pilot signal $Y_r(t)$) an input signal for the neural network 62, which neural network generates an channel estimator W(t) that is used by the channel estimator module 61. The neural network 62 is parametrized by the parameter sets a and b, which are provided by the offline learning module 63. When deploying the base station, a default parameter set (obtained e.g., by computer simulations) is typically set (since training data from the actual deployment is usually unavailable). However, once the base station starts to successfully decode transmissions (e.g. uplink transmissions), a training database starts to be compiled, which database is used by the offline leaning module 63 to generate new/improved parameter sets a and b.

Decorrelated received uplink pilot vectors $Y_r(t)$ from observation times t=1, . . . , T can be sampled by the sample covariance module 64. The variable c denotes the (vectorized) scaled sample covariance matrix of the decorrelated received (uplink) pilot vectors $Y_r(t)$ from observation times t=1, . . . , T; that is, $$\hat{c}(t) = vec\left\{ \frac{1}{\sigma^2} \sum_{t=1}^{T} Y_r(t) Y_r^H(t) \right\}. \quad \text{Eq. (1)}$$

Figure 8:
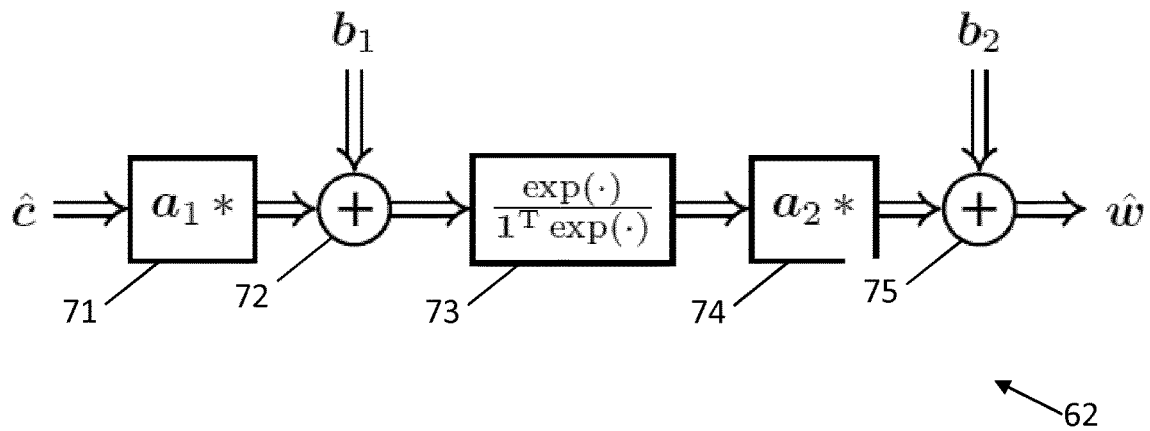
FIG. 8 is a block diagram of a neural network that may be used in the system of FIG. 7 in an example embodiment.

FIG. 8 is a block diagram of an example implementation of the neural network 62 that may be used in the system 60.

The neural network 62 comprises a convolutional neural network (CNN) comprising a first CNN layer 71, summing module 72, a softmax activation layer 73, and a second CNN layer 74 and a second summing module 75. The first CNN layer 71 includes neural network weights $a_1$, the first summing module 72 receives neural network weights $b_1$, the second CNN layer 74 includes the neural network weights $a_2$ and the second summing module 75 receives neural network weights $b_2$. The neural network 62 may take many forms. For example, the neural network may comprise multiple layers (e.g. two layers) and an activation function (e.g. a softmax or ReLu activation); the skilled person will, however, be aware of many possible alternative neural network configurations that could be used.

The output ŵ(t) of the neural network 62 comprises the (vectorized) weights of the (MMSE) optimal channel estimator, which are used to compute the channel vector estimate Ĥ(t)= $\widehat{W(t)}$ $Y_r(t)$ at time t.

For the above scenario (single cluster, very large ULA/URA), the CNN's constants (e.g., the weight vector θ=($a_1$, $b_1$, $a_2$, $b_2$)) are given in closed-form by analytic expressions.

However, to make this model-based approach robust such that it still works for modified model parameters or more general channel models, some constants (e.g., the weight vector θ=($a_1$, $b_1$, $a_2$, $b_2$) that occur in the optimal estimator for the considered special case may be untied to become optimization variables, and these variables may be trained by machine learning methods. The result is an estimator that works well in more general 3GPP propagation channel models, in which the globally optimal estimator would no longer be tractable.

Figure 9:
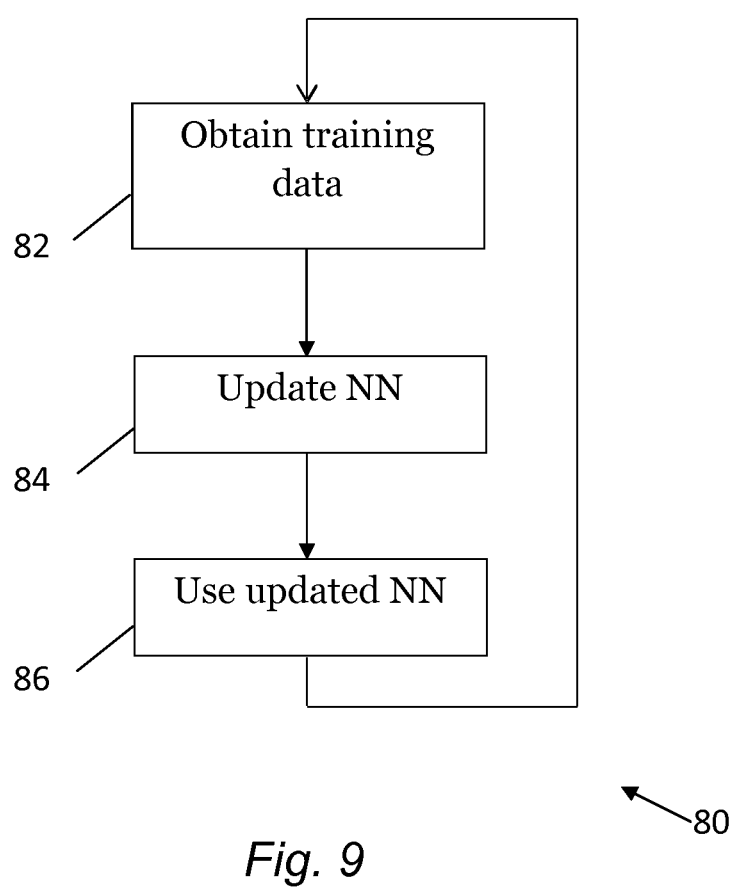
FIG. 9 is a flow chart showing an algorithm in accordance with an example embodiment.

FIG. 9 is a flow chart showing an algorithm, indicated generally by the reference numeral 80, in accordance with an example embodiment. The algorithm 80 may be used in the training of the neural network 62 described above.

The algorithm 80 starts at operation 82 where training data is obtained. As discussed below, the training data may be obtained during the operation of the communication system (such as the system 1 described above).

At operation 84, the neural network (e.g. the neural network 62) is updated in response to the obtained training data. At operation 86, the updated neural network is used (e.g. to produce weights of the channel estimator that from part of the receiver.

The algorithm 80 can the return to operation 82, where further training data is obtained and the neural network further updated.

The training of the neural network weights using the algorithm 80 is a learning problem, which can be solved with a stochastic gradient method to find (local) optima for the variables. The neural network estimator typically requires a data set {(H(1), $Y_r(1)$), (H(2), $Y_r(2)$), . . . } of (noise-free) channel realizations and corresponding (noisy) observations to optimize the variables. Therefore, one could also take samples of channel vectors and observations from a measurement campaign to learn the NN-MMSE estimator for the "true" channel model. This, however, requires that the SNR during the measurement campaign is significantly larger than the SNR in operation.

Figure 10:
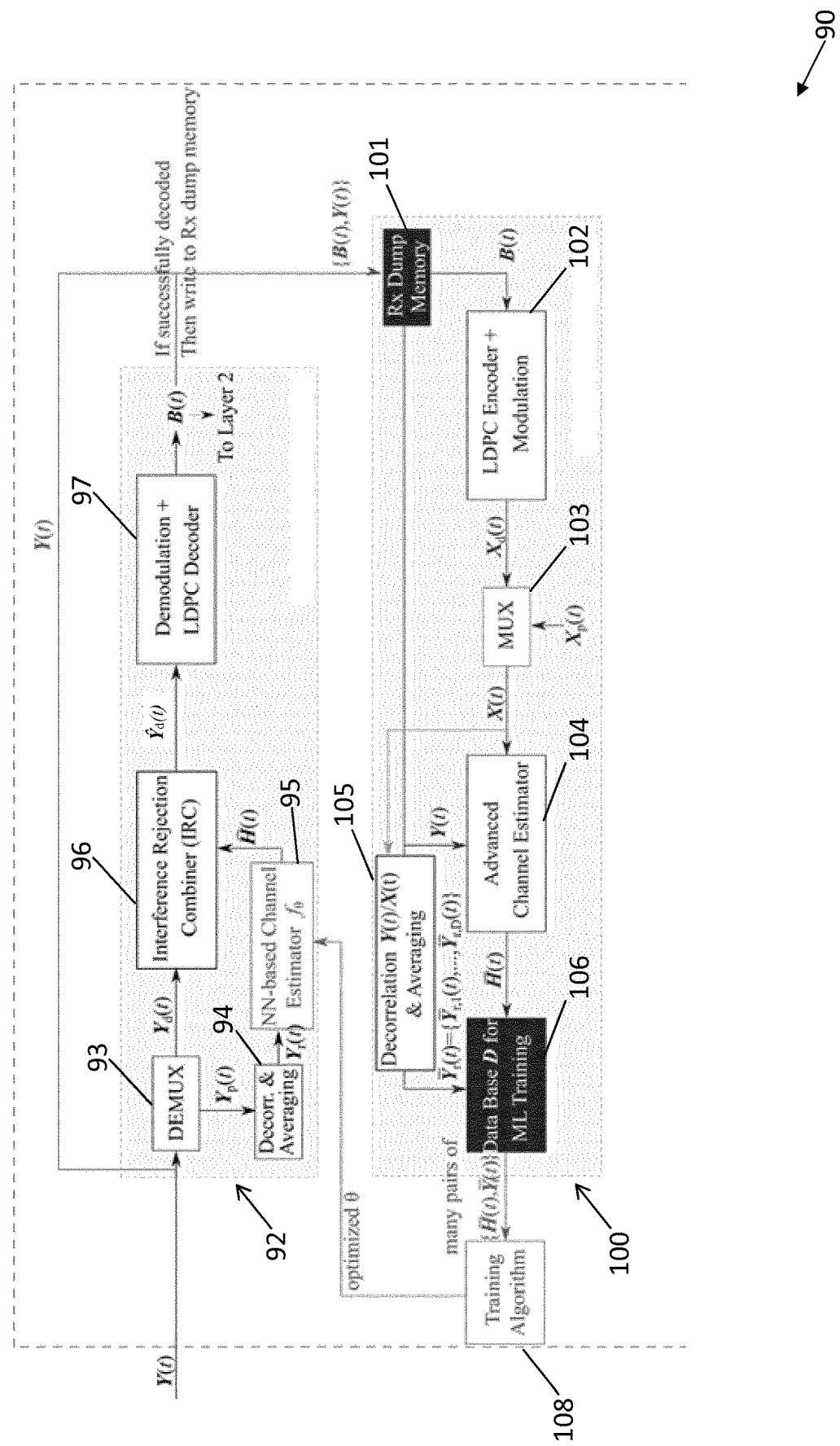
FIG. 10 is a block diagram of a system in accordance with an example embodiment.

FIG. 10 is a block diagram of a system, indicated generally by the reference numeral 90, in accordance with an example embodiment. The system 90 provides a mechanism for generating training data, for example for use in training the neural network described above.

The system 90 comprises an uplink receive chain 92 (that has some similarities with the receiver 6 described above), a training data generator 100 and a training algorithm 108. As described in detail below, the training algorithm 108 is used to train a channel estimator 95 of the uplink receive chain 92 on the basis of training data generated by the training data generator 100.

As shown in FIG. 10, the uplink receive chain 92 comprises a demultiplexer 93, a decorrelation and averaging module 94, a channel estimator 95, an interference rejection combiner (IRC) 96 and a demodulator and decoder module 97.

The receiver chain 92 receivers one or more symbols Y(t) from the channel 4.

The received signal Y(t) is demultiplexed (i.e. separated) into received pilot symbols $Y_p(t)$ and received data symbols $Y_d(t)$ by the demultiplexer 93.

The decorrelation and averaging module 94 implements symbol-by-symbol division of received and transmitted pilot symbols $Y_p(t)/X_p(t)$) and averages those values (e.g. using a window function) to generate symbols $Y_r(t)$ that are provided to the channel estimator 95. This symbol vector is used to compute the scaled sample covariance matrix as given in equation (1) above, which is then fed into the neural network based channel estimator 95 that is used to compute the channel estimate $\hat{H}(t) = \overline{W(t)} Y_r(t)$ at time t.

In this way, the received pilot signals $Y_p(t)$ are processed using the channel estimator 95. As described in detail below, the channel estimator module 95 comprises a trainable algorithm configured to generate an estimate of a transfer function of the channel.

The estimate of the channel transfer function $\hat{H}(t)$ is used by the IRC 96 to equalize (or otherwise process) the received data symbols $Y_d(t)$ to generated processed data symbols $\hat{Y}_d(t)$. When the received data symbols $Y_d(t)$ are comprised in a plurality of data layers, the IRC 96 may, for example, be configured to cancel received signal contributions of symbols corresponding to one or more unwanted data layers of the plurality of data layers to allow processing of received symbols from a respective wanted data layer.

The processed data symbols $\hat{Y}_d(t)$ are demodulated and decoded by the demodulator and decoder module 97. Thus, the data symbols are converted into received data bits B(t).

If the decoding is successful (as determined, for example, by a successful CRC check), then the information bits B(t) are accepted (e.g. by handing over to Layer 2 (MAC) and having the system 90 acknowledge the proper reception of the data). As discussed above, if decoding is not successful, then the base station may trigger a re-transmission of the data.

A means for determining whether the received transmission bits are deemed to be correct, such as a parity checking module, may, for example, be provided as part of the uplink receive chain 92 (e.g. as part of the demodulation and decoder module 97) or as a separate module.

As shown in FIG. 10, the training data generator 100 comprising an input interface 101, an encoder and modulation module 102, a multiplexer 103, a channel estimator 104, a decorrelation and averaging module 105 and a database 106. The database 106 acts as an output interface of the training data generator 100.

The input interface 101 stores for all (or a subset of) successfully decoded uplink transmissions some or all of the following information (in form of grouped data sets):
received symbols Y(t);
information B(t); and
uplink control information (UCI), as e.g., signalled to the UE via PDCCH (which contains information about the encoding and resource mapping).

The encoder and modulation module 102 re-encodes the information bits B(t) to generates data symbols $X_d(t)$. The data symbols are multiplexed (by multiplexer 103) with the pilot signals $X_p(t)$ to regenerate the UE transmit signal X(t). It should be noted that since the information bits B(t) have been determined to be correct, then the UE transmit signal X(t) should match the originally transmitted signal.

Based on X(t) and Y(t), the channel estimator 104 produces an improved estimate H(t) for the channel transfer function. The channel estimator 104 may take many forms, such as a classical least-squares channel estimator. However, a channel estimator exploiting the reliability information (e.g. soft bits) obtained from the decoder 97 could be used to improve the estimation performance. It should also be noted that, in 5G with a double-symbol DMRS configuration of type 2, only 12 pilot symbols $X_p(t)$ per physical resource block (PRB) are available for channel estimation. Using the re-generated UE transmit signal X(t), 156 symbols per PRB can be used for channel estimation, which leads a reduction of the normalized mean square error NMSE in the channel estimates by ~11 dB. So, channel estimates with NMSEs in the order of −20 dB to −30 dB can be achieved, which is high enough for considering those estimates as the true channel transfer function.

The decorrelation and averaging module 105 receives both X(t) and Y(t) and generates decorrelated and averaged receive symbols $\overline{Y}_r(t)$. The module 105 may be implemented in many ways. For example, the symbols $\overline{Y}_r(t)$ may be obtained from the pilot symbols only (yielding the same $Y_r(t)$ as in the channel estimation module in the uplink receive chain 92) or may alternatively be obtained from the pilot and (re-generated) data symbols. For the latter case, the $\overline{Y}_r(t)$ consists of multiple noisy observations {$\overline{Y}_r(t)$, . . . , $\overline{Y}_{r,D}(t)$} for the same channel realization H(t). In any event, the symbols $\overline{Y}_r(t)$ should contain noise and interference with the same statistics as seen by the channel estimator 95 in the uplink receive chain 92.

The improved estimates $\overline{H}(t)$ output by the channel estimator 104 are jointly stored in the database 106 with the decorrelated & averaged receive symbols $\overline{Y}_r(t)$ output by the decorrelation and averaging module 105. The database 106 serves as the output interface of the training data generator 100 to the training algorithm 108. The operation of the training algorithm 108 is described in detail below.

Figure 11:
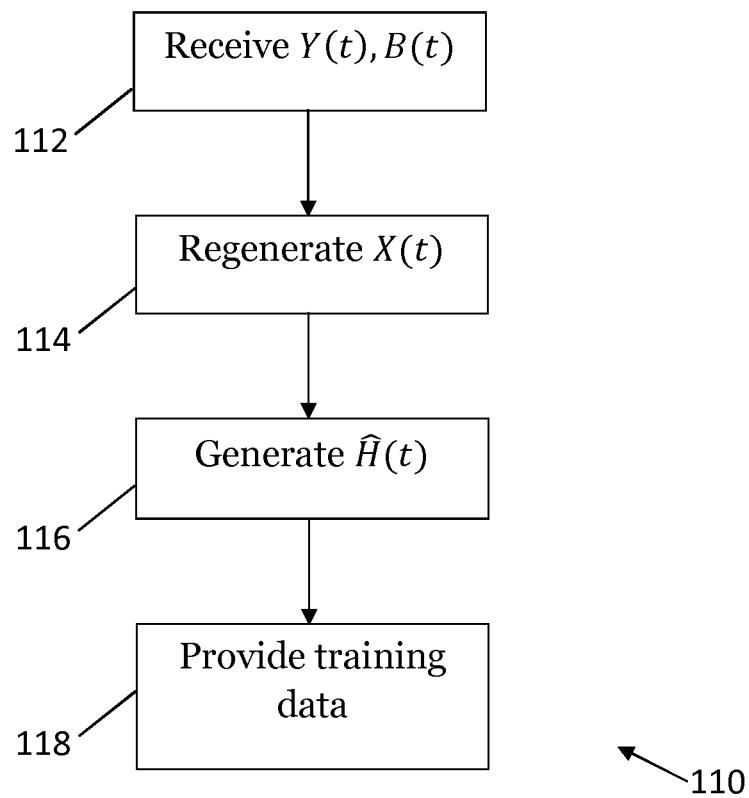
FIG. 11 is a flow chart showing an algorithm demonstrating an example use of the training data generator of FIG. 10.

FIG. 11 is a flow chart showing an algorithm, indicated generally by the reference numeral 110, demonstrating an example use of the training data generator 100 of FIG. 10.

The algorithm 110 starts at operation 112, where one or more received symbols Y(t) and one or more received bits B(t) are received at an input of the training data generator 100. As described above, the training data generator 100 may form part of a receiver of a transmission system comprising a transmitter, a channel and the receiver (such as the transmitter, channel and receiver of the system 1 described above).

At operation 114, one or more received bits B(t) that are deemed to be correct are converted into one or more estimated transmission symbols, thereby regenerating the originally transmitted symbols X(t). The operation 114 may be implemented by encoding and modulating the received data bits (using module 102) and multiplexing the modulated symbols with pilot symbols (e.g. in a 5G transmission system) using the multiplexer 103. The modulation (that forms part of the encoding and modulation module 102) may, for example, convert encoded bits (e.g. LDPC coded bits) into modulated symbols (e.g. QAM symbols, or some other symbols). The multiplexer 103 may therefore combined modulated (and encoded) bits with the said pilot symbols.

At operation 116, an estimated channel transfer function H(t) is generated (for example using the channel estimator 104) based, at least in part, on one or more of the estimated transmission symbols X(t) and corresponding received symbols Y(t).

At operation 118, training data pairs are provided (to the database 106). Each training data pair comprises a first element based on the estimated channel transfer function $\overline{H}$(t) and a second element based on the corresponding received symbols (e.g. decorrelated and received data, as output by the module 105).

Figure 12:
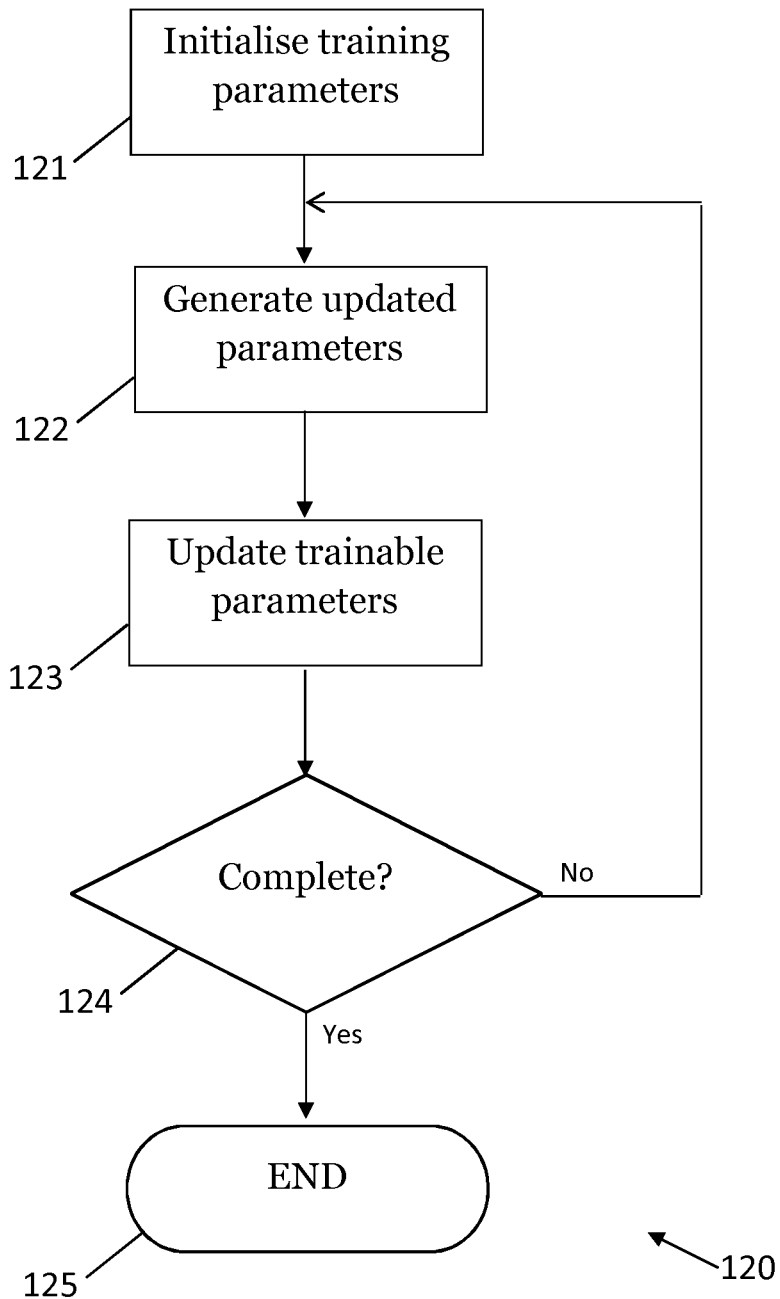
FIG. 12 is a flow chart showing an algorithm in accordance with an example embodiment.

FIG. 12 is a flow chart showing an algorithm, indicated generally by the reference numeral 120, in accordance with an example embodiment. The algorithm 120 provides an example arrangement for training the channel estimator 95 under the control of the training algorithm 108 of the system 90 described above.

The algorithm 120 starts at operation 121, where trainable parameters of the channel estimator 95 of a transmission system (such as the system 1) are initialised. The channel of the transmission system may initially be an unknown channel. Thus, the initialisation may be carried out without knowledge of the characteristics of the channel.

At operation 122, updated parameters for the channel estimator 95 are generated based on training data pairs stored by the database 106. The training data pairs, which are generated by the training data generator 100 are based on real data transmitted by the relevant transmission system. Thus, the algorithm 120 implements online training. As described above, each training data pair comprises a first element based on an estimated channel transfer function and a second element based on corresponding received symbols (e.g. decorrelated and averaged received symbols). The operation 122 may be implemented by minimising a loss function. Thus, the trainable parameters of the channel estimator 95 may be updated using machine learning principles.

A neural network training algorithm for the channel estimator may therefore be based on a data within the database 106 (e.g. D={($\overline{H}$(1), $\overline{Y}_r$(1)), ($\overline{H}$(2), $\overline{Y}_r$(2)), ... } provided by the training data generator 100. The operation 122 may, for example, be implemented using stochastic gradient method. For example, in the training of the example neural network 62 described above, stochastic gradient descent may be used to find (local) optima for the weight vector $\theta=(a_1, b_1, a_2, b_2)$, thereby seeking to determine optimised values for the (updated) parameters of the channel estimator.

At operation 123 the trainable parameters of the channel estimator 95 are updated on the basis of said updated parameters generated in operation 122.

At operation 124, it is determined whether the algorithm 120 is complete, thereby providing a mechanism for controlling repeated generation of updated parameters. If the algorithm 120 is complete, the algorithm terminates at operation 125. If not, the algorithm returns to operation 122 and further updated parameters are generated.

The operation 124 may determine that the algorithm is complete if a first condition is met. Example conditions include one or more of a defined number of iterations and a defined performance level. Another example condition is that the parameters have not changed by more than a threshold amount over a defined number of iterations. In some embodiments, the algorithm 120 may be carried out in response to updated training data being available (e.g. when a defined number of additional training data points have been generated).

Acquiring real-world training data for the neural network based channel estimator 95 (e.g., high-SNR channel realizations from an actual deployment) in an operating wireless network is not straightforward. The uplink channel estimation process is generally noise- and interference-limited, so that the acquired channel information is perturbed and does not represent the true channel as needed for the neural network training. This particularly holds true for cell edge users, whose power spectral density during channel sounding can be very low due to transmit power constraints.

The on-line training algorithms described herein generates high-SNR channel information from the received signal in the uplink. This allows the training of the channel estimator 95 with channel information from the concrete deployment without the need of a preceding channel measurement campaign. Further, the neural network-based channel estimator can adapt to changes in the deployment's environment and gathers an ever-growing pool of training data, which may yield an improved channel estimation performance over time.

The principles described herein are applicable to wide variety of communication systems. For example, to exploit the full potential of massive MIMO communication systems, it may be important to have good channel information.

Figure 13:
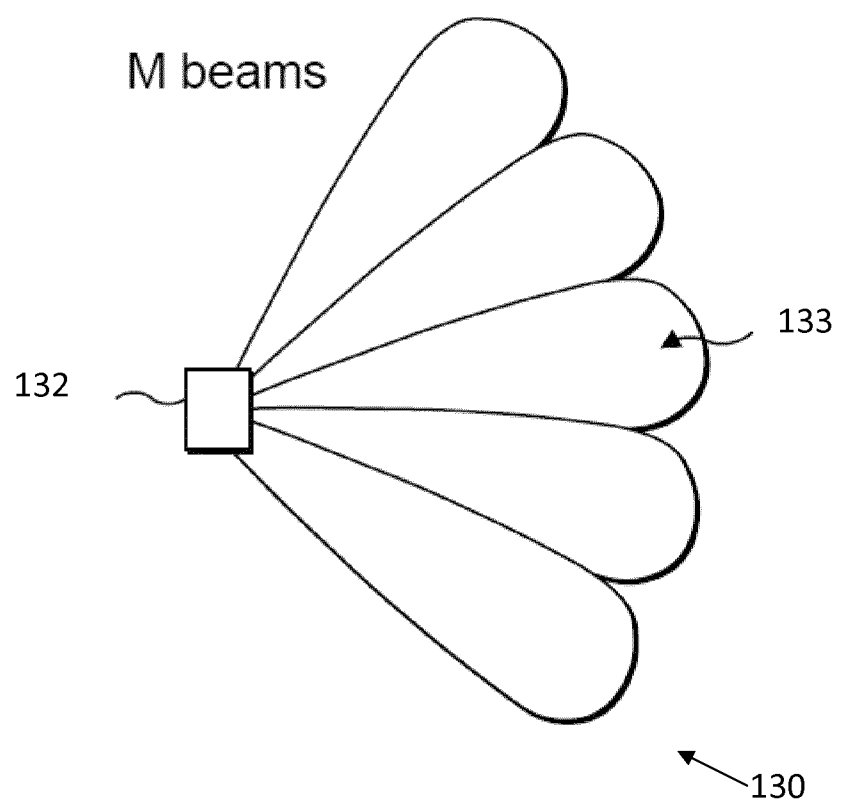
FIG. 13 is a block diagram of a system in accordance with an example embodiment.

FIG. 13 is a block diagram of a system, indicated generally by the reference numeral 130, in accordance with an example embodiment. The system 130 comprises a node 132 of a mobile communication system (such as a base station, eNB, gNodeB, gNB etc.). In use, the node 132 communicates with a number of user devices (not shown).

As shown in FIG. 13, the node 132 comprises a number of beams (such as the beam 133) that can be used for communications with one or more user devices. The system 130 can therefore be used to implement a grid-of-beams type communication between the node 132 and one or more user devices. In one example implementation, the base station 132 and the user device 133 communicate using radio frequencies in the mm-wave band (e.g. of the order of 30 to 300 gigahertz). However, other frequency ranges (e.g. lower frequencies) may be used.

If accurate channel information is available, a base station can form sharp beams to the desired users of the system 130 to avoid inter-user interference and to benefit from the array gain of a large antenna array.

In the context of beamformed transmissions, user devices with multiple transmit antennas can beamform their data layer in the uplink (e.g., DMRS pilots and associated data symbols can be mapped to multiple transmit antennas using a beamforming weight vector). The transmit beamforming affects the propagation statistics of the effective propagation channel (as seen, for example, by the uplink receiver chain 92 in the base station) in terms of receive antenna correlation and coherence bandwidth. In one example implementation, separate data bases (e.g., $D_{nonBF}$, $D_{BF}$) and separate sets of neural network weight vectors (e.g., $\theta_{nonBF}$ and $\theta_{BF}$) may be maintained, one for non-beamformed transmissions (which may include transmit antenna switching schemes) and one for beamformed transmissions. As a potential extension, one could also implement dedicated databases and neural network weight sets for the different transmit antenna configurations (that occur in the wireless network).

The neural network based channel estimator 95 described above may store the multiple neural network weight vectors. Further, the channel estimator 95 may be provided with an additional input parameter which will indicate the (index of the) weight vector that shall be used for channel estimation.

A more elaborated scheme to deal with complexity of training of multiple neural networks is to make use of superposition of multiple neural networks. Since the neural networks described herein may learn meta-features of the channel, e.g. clusters of scatterers, we can assume that neural networks trained on the same channel with different numbers of inputs and outputs share a lot of information with one another.

Thus, it is possible to train one large neural network that fits the largest number of multiple antenna input-outputs configurations. We introduce additional selection parameters that are responsible to choose which MIMO configuration is the neural network supposed to be adapted for. The configurations are shared by the user device or by a context a priori as an additional input parameter to the neural network.

For the sake of simplicity, the description above has been restricted to embodiments relating to a single-layer transmission in the uplink of a wireless network. As outlined in further embodiments below, the principles described herein can be applied in other embodiments, for example:

- at the UE side in the wireless network's downlink (the potential benefit would be a MMSE-like channel estimator with very-low complexity);
- multiple (spatial) layers transmitted from a single or multiple UEs; and/or
- multi-antenna transmitters with and without beamformed data layers.

In an example embodiment, one or more received symbols are comprised in a plurality of data layers, for example L data layers. L data layers may be (substantially simultaneously) transmitted by a single or multiple users (i.e., single- or multi-user MIMO). The transmit signal of the l-th data layer may be denoted by $X_l(t)$. Further, each of the L transmit signals may pass through a different (possibly beamformed) propagation channel $H_l(t)$.

Multi-layer transmissions may be transparent to the neural network-based channel estimator (inside the uplink receive chain 92) because of (code/time/frequency) orthogonal pilot sequences are used (e.g., the decorrelation and averaging operation separates the pilots signals from the different layers).

For the data symbols of a wanted data layer, for example layer 1, the receive equalizer (e.g., an interference rejection combiner) mitigates the interference from the other unwanted data layers so that the corresponding information bits $B_l(t)$ can be successfully decoded in perhaps 90% of all transmissions. These information bits can be used to re-generate the transmit symbols $X_l(t)$ of that particular layer. However, the advanced channel estimation module (which utilizes the re-generated data symbols $X_l(t)$) may not be directly applicable because the receive signal Y(t) contains the interference from the other unwanted(co-scheduled) data layers (i.e., for the advanced channel estimation of $\overline{H}_l(t)$ one needs the received signal $Y_l(t)$ that contains signal portion only from the l-th layer). To remove that interference, an interference cancellation (IC) module may be used. If all transmission layers have been successfully decoded, the IC module can subtract the received signal contributions of one or more unwanted data layers, such that a resulting received signal $Y_l(t)$ containing received symbols from the wanted data layer (layer 1) may be processed. The resulting signal $Y_l(t)$ can be used together with the re-generated transmit signal $X_l(t)$ of the l-th layer to perform the advanced channel estimation (utilizing the data carriers) yielding $\overline{H}_l(t)$.

Figure 14:
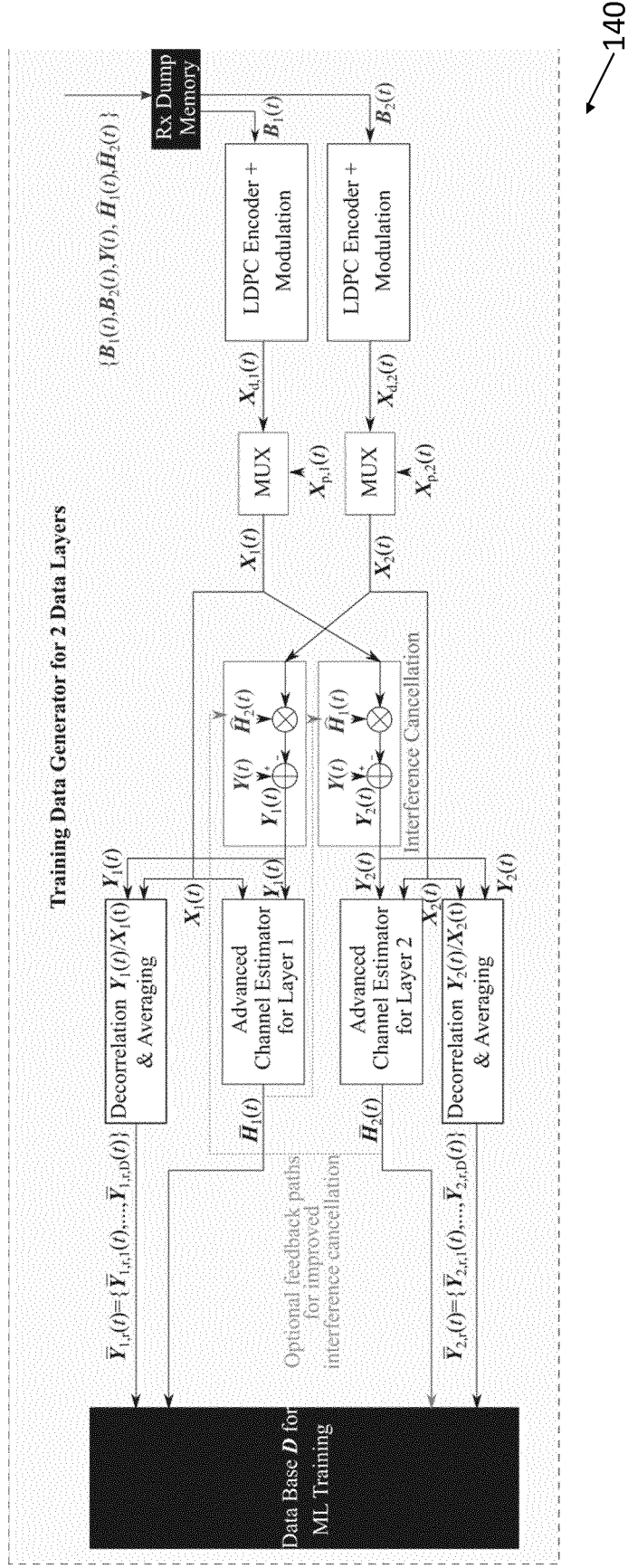
FIG. 14 is a block diagram of a system in accordance with an example embodiment.

FIG. 14 is a block diagram of a system, indicated generally by the reference numeral 140, in accordance with an example embodiment. The system 140 illustrates the mechanism described above for the case of two (data) layers. The shown mechanism can be easily extended to the general case of L layers.

Further, the dashed lines indicate a possible extension where the improved channel estimates $\overline{H}_1(t)$ and $\overline{H}_2(t)$ are fed back to the interference cancellation modules to generate an improved interference-free signal.

One should note that the computational complexity of this training data generator does not play a big role because there are no real-time constraints. It can run on e.g., a general purpose processor.

In addition to providing improved channel estimates (that are used for the neural network training), the channel estimators described herein can also provide improved estimates for covariance matrix $R_I(t)$ of the noise plus (intercell) interference I(t) inside the received signal Y(t). The signal contribution I(t) from the noise plus interference can be easily obtained by subtracting the regenerate receive signal $\overline{Y}(t)=\overline{H}(t)X(t)$ from the received signal Y(t); that is, $I(t)=Y(t)-\overline{Y}(t)$. The improved interference plus noise covariance matrix can e.g., be used to generate (i.e., synthesize) additional noisy observations $\overline{Y}_r(t)$ for a given channel realization $\overline{H}(t)$, which can improve the neural network training.

First simulation results have shown that the performance of the neural network based channel estimator can be improved by using SNR-specific neural network weight vectors 6. Therefore, we propose to classify the received data transmissions based on the receive SNR (e.g., SNR classes could be {low,mid,high}, defined by upper SNR limits e.g., −10 dB, 0 dB and 10 dB). For each SNR class s, a dedicated data base $D_s$ and neural network weight vector $\theta_s$ must be implemented and maintained.

The neural network based channel estimator module in the uplink receive chain described above may store the multiple neural network weight vectors. Further, the neural network based channel estimator may get a new input parameter s which will indicate the SNR class of the current reception, so that the module applies the correct NN weight vector $\theta_s$. The SNR class s can be determined with the help of the decorrelated and averaged pilot symbols $Y_r(t)$.

Figure 15:
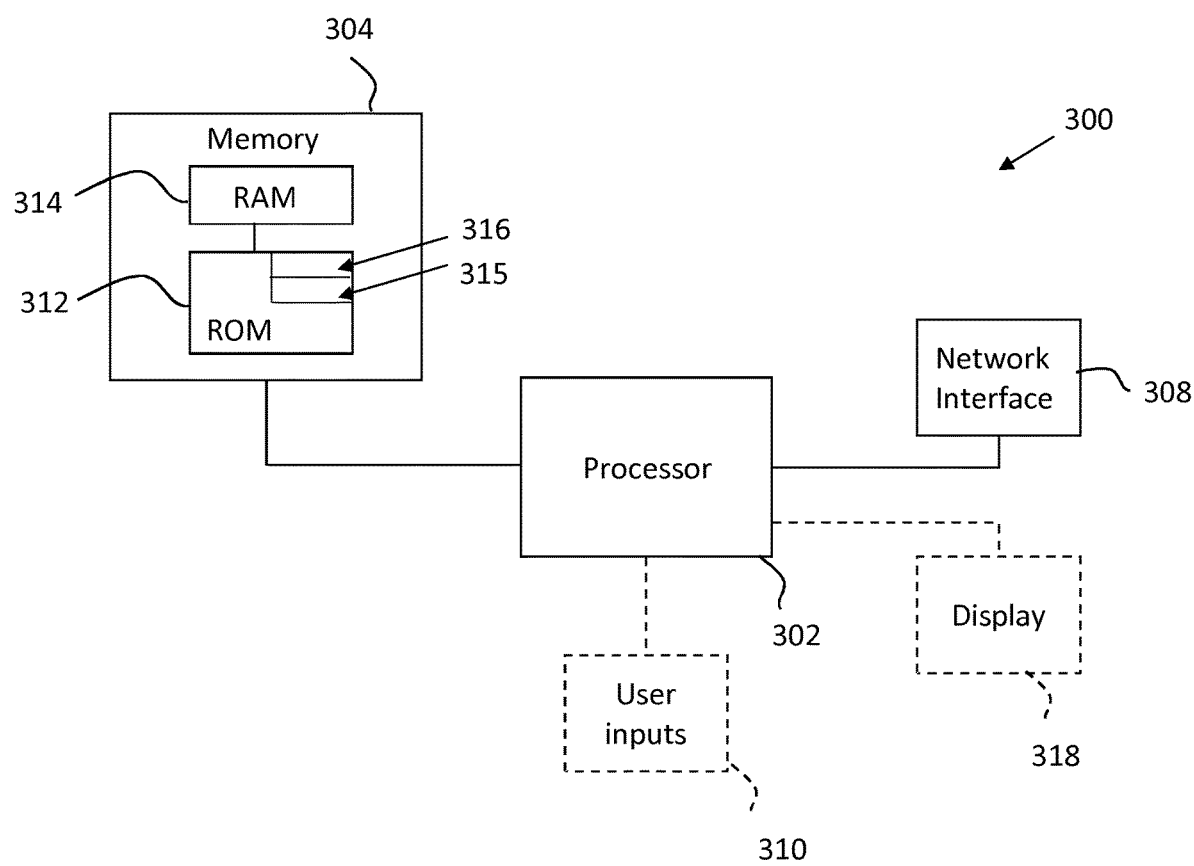
FIG. 15 is a block diagram of a components of a system in accordance with an exemplary embodiment.

For completeness, FIG. 15 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 10, 30, 50, 80, 110 and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16A:
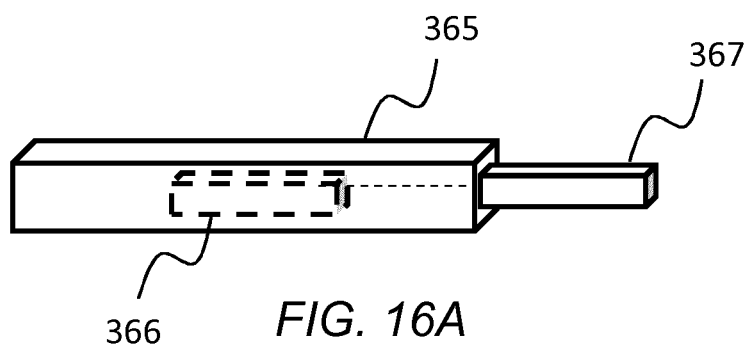
FIGS. 16A and 16B show tangible media, respectively a removable memory unit and a compact disc (CD) storing computer-readable code which when run by a computer perform operations according to embodiments.
Figure 16B:
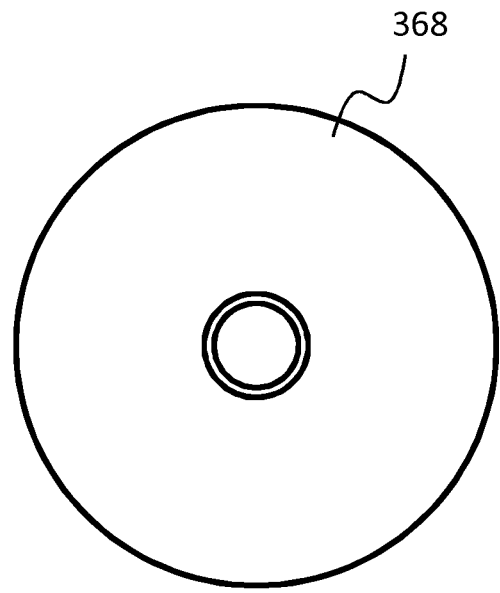

FIGS. 16A and 16B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 4, 6, 9, 11 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory storing instructions that, when executed by the at least one processor, cause the apparatus at least to:
initialize trainable parameters of a channel estimator of a receiver of a transmission system, wherein the transmission system comprises a transmitter and the receiver, wherein the transmitter includes a transmitter algorithm for converting one or more transmission bits into one or more transmission symbols and the receiver includes a receiver algorithm for converting one or more received symbols into one or more received bits and wherein the channel estimator of the receiver generates an estimate of a transfer function of a channel;
generate updated parameters for the channel estimator of the receiver based on stored training data pairs, wherein a training data pair comprises a first element based on an estimated channel transfer function and a second element based on corresponding one or more of the received symbols, wherein the generating the updated parameters comprises minimizing a loss function;

wherein the second element of the training data pair used to generate the updated parameters for the channel estimator of the receiver, that is based on the one or more of the received symbols, comprises a decorrelation and averaging of the one or more of the received symbols and estimated transmission symbols; and update the trainable parameters of the channel estimator of the receiver on the basis of the generated updated parameters.

2. The apparatus as claimed in claim 1, where the instructions, when executed by the at least one processor, cause the apparatus at least to:

control repeated generation of updated parameters using the generating of the updated parameters; and control repeated updating of the trainable parameters using the updating of the trainable parameters.

3. The apparatus as claimed in claim 2, wherein:

the controlling repeated generation of the updated parameters comprises operating in response to updated training data; and the controlling repeated updating of the trainable parameters comprises operating in response to updated training data.

4. The apparatus as claimed in claim 1, wherein the instructions, when executed by the at least one processor, cause the apparatus at least to:

classify the one or more received symbols into two or more signal to noise ratio classes, based on signal to noise ratios of the one or more received symbols;

maintain at least one first updated parameter of the updated parameters for the channel estimator, wherein the at least one first updated parameter corresponds to a first signal to noise ratio class of the two or more signal to noise ratio classes; and maintain at least one second updated parameter of the updated parameters for the channel estimator, wherein the at least one second updated parameter corresponds to a second signal to noise ratio class of the two or more signal to noise ratio classes.

5. The apparatus as claimed in claim 1, wherein the instructions, when executed by the at least one processor, cause the apparatus at least to:

maintain at least one first parameter of the updated parameters for the channel estimator, wherein the at least one first parameter is maintained for non-beamformed transmissions; and maintain at least one second parameter of the updated parameters for the channel estimator, wherein the at least one second parameter is maintained for beamformed transmissions.

6. The apparatus as claimed in claim 1, further comprising a database for storing the training data pairs.

7. The apparatus of claim 1, wherein the instructions, when executed by the at least one processor, cause the apparatus at least to:

determine whether the one or more received bits have been successfully decoded, based on the estimate of the transfer function and the estimated channel transfer function; and transfer the one or more received bits to a communication layer of a network, in response to determining that the one or more received bits have been successfully decoded.

8. The apparatus of claim 1, wherein the instructions, when executed by the at least one processor, cause the apparatus at least to:

determine whether the one or more received bits have been successfully decoded, based on the estimate of the transfer function and the estimated channel transfer function; and transfer the one or more received bits to a medium access control layer of a communication network, in response to determining that the one or more received bits have been successfully decoded.

9. The apparatus of claim 1, wherein the corresponding one or more received symbols, upon which the second element of the training data pair is based, correspond to the estimated channel transfer function, upon which the first element of the training data pair is based, at least based on a time the one or more received symbols are received.

10. The apparatus of claim 1, wherein the instructions, when executed by the at least one processor, cause the apparatus at least to:

train a neural network based on noise-free channel observations and noisy observations;

generate the estimate of the transfer function of the channel with the channel estimator using the neural network trained based on the noise-free channel observations and the noisy observations; and determine the second element of the training data pair based on the one or more received symbols, wherein the one or more received symbols, upon which the second element of the training pair is based, comprises interference observed with the channel estimator of the receiver.

11. The apparatus of claim 1, wherein the transmission system comprises one or more channels.

12. The apparatus of claim 1, wherein the instructions, when executed by the at least one processor, cause the apparatus at least to:

train a neural network based on successfully decoded uplink transmissions; and generate the estimate of the transfer function of the channel with the channel estimator using the neural network trained based on successfully decoded uplink transmissions.

13. A method comprising:

receiving one or more received symbols, wherein the received symbols are received at a receiver of a transmission system comprising a transmitter and the receiver, wherein the transmitter includes a transmitter algorithm for converting one or more transmission bits into one or more transmission symbols and the receiver includes a receiver algorithm for converting the one or more received symbols into one or more received bits;

converting one or more of the received bits that are determined to be correct into one or more estimated transmission symbols;

generating an estimated channel transfer function based on one or more of the estimated transmission symbols and corresponding one or more of the received symbols; and providing training data pairs used to generate update parameters for a channel estimator of a receiver, wherein a training data pair comprises a first element based on the estimated channel transfer function and a second element based on corresponding one or more of the received symbols;

wherein the second element of the training data pair used to generate the updated parameters of the channel estimator of the receiver, that is based on the one or more of the received symbols, comprises a decorrelation and averaging of the one or more of the received symbols and the estimated transmission symbols.

14. The method of claim 13, further comprising:
determining the one or more received bits to be correct with low density parity check decoding and demodulating;
converting, with low density parity cheek encoding and modulating, the one or more of the received bits that are determined to be correct into the one or more estimated transmission symbols; and
rejecting one or more of the received bits that are determined to not be correct.

15. A method comprising:
initializing trainable parameters of a channel estimator of a receiver of a transmission system, wherein the transmission system comprises a transmitter and the receiver, wherein the transmitter includes a transmitter algorithm for converting one or more transmission bits into one or more transmission symbols and the receiver includes a receiver algorithm for converting one or more received symbols into one or more received bits and wherein the channel estimator of the receiver generates an estimate of a transfer function of a channel;
generating updated parameters for the channel estimator of the receiver based on stored training data pairs, wherein a training data pair comprises a first element based on an estimated channel transfer function and a second element based on corresponding one or more of the received symbols, wherein the generating of the updated parameters comprises minimizing a loss function;
wherein the second element of the training data pair used to generate the updated parameters of the channel estimator of the receiver, that is based on the one or more of the received symbols, comprises a decorrelation and averaging of the one or more of the received symbols and estimated transmission symbols; and
updating the trainable parameters of the channel estimator of the receiver on the basis of the generated updated parameters.

16. A non-transitory computer readable medium including a computer program comprising instructions for causing an apparatus to perform at least the following:
initialize trainable parameters of a channel estimator of a receiver of a transmission system, wherein the transmission system comprises a transmitter and the receiver, wherein the transmitter includes a transmitter algorithm for converting one or more transmission bits into one or more transmission symbols and the receiver includes a receiver algorithm for converting one or more received symbols into one or more received bits and wherein the channel estimator of the receiver generates an estimate of a transfer function of a channel;
generate updated parameters for the channel estimator of the receiver based on stored training data pairs, wherein a training data pair comprises a first element based on an estimated channel transfer function and a second element based on corresponding one or more of the received symbols, wherein the generating the updated parameters comprises minimizing a loss function;
wherein the second element of the training data pair used to generate the updated parameters for the channel estimator of the receiver, that is based on the one or more of the received symbols, comprises a decorrelation and averaging of the one or more of the received symbols and estimated transmission symbols; and
update the trainable parameters of the channel estimator of the receiver on the basis of the generated updated parameters.

\* \* \* \* \*